UNITED STATES PATENT OFFICE.

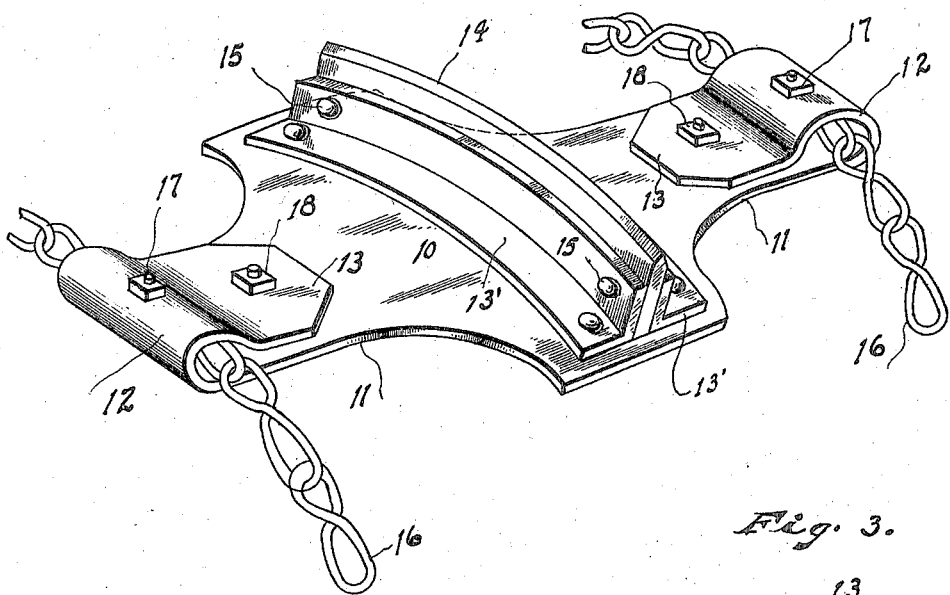
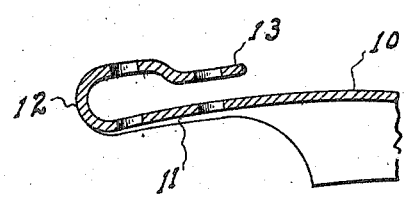
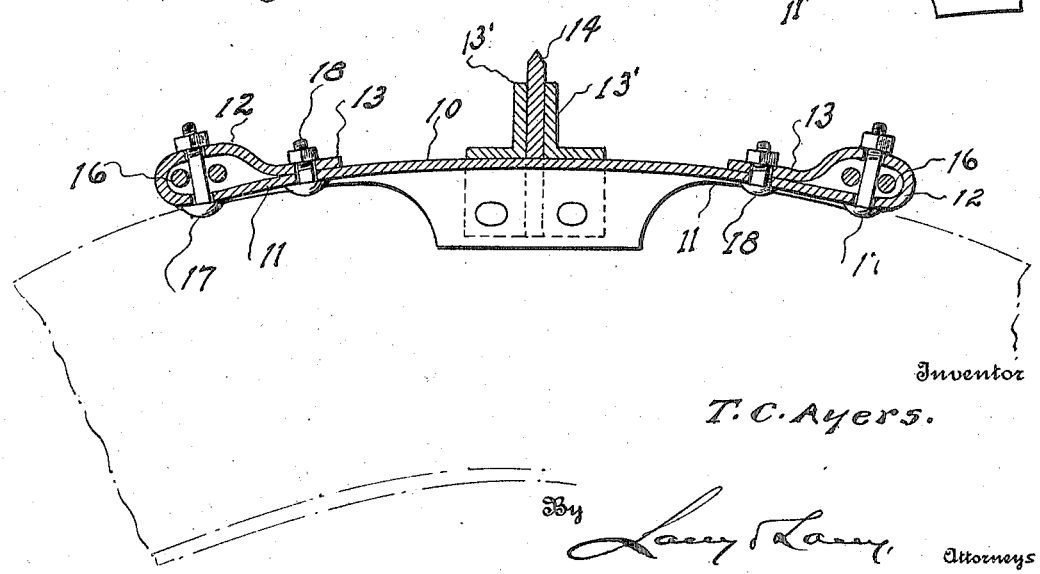

THEODORE C. AYERS, OF ST. CLAIRSVILLE, OHIO.

TRACTION DEVICE FOR NONSKID CHAINS.

1,417,130.  Specification of Letters Patent.  Patented May 23, 1922.

Application filed October 4, 1920. Serial No. 414,542.

*To all whom it may concern:*

Be it known that I, THEODORE C. AYERS, citizen of the United States, residing at St. Clairsville, in the county of Belmont and State of Ohio, have invented certain new and useful Improvements in Traction Devices for Nonskid Chains, of which the following is a specification.

This invention relates to an improved traction device for motor vehicles and has as one of its principal objects to provide a device of this character which may be applied to the non-skid chains of a vehicle to furnish a secure purchase for the rear wheels of the vehicle when passing over ice or slippery roads, or pulling out of the mud or sand.

A further object of the invention is to provide a device which may be readily attached to the non-skid chains when desired and may as easily be removed therefrom.

And the invention has as a still further object to provide a device which may be readily employed in connection with non-skid chains of conventional design and which may also be used upon substantially any conventional make of motor vehicle.

Other and incidental objects will appear hereinafter.

In the drawings:

Figure 1 is a perspective view of my improved traction device, the device being shown connected to a pair of the cross strands of a non-skid chain of conventional design, Figure 2 is a longitudinal sectional view taken medially through the device, and Figure 3 is a detail section showing the normal shape of the hooks of the device before being applied.

In carrying the invention into effect, I employ a body plate 10 which is preferably formed from a piece of suitable resilient sheet metal and is provided at opposite sides thereof with reduced oppositely directed arms 11. The body plate is curved both longitudinally and transversely to fit the periphery of a tire and the arms are, of course, similarly curved. At their outer ends, the arms are bent up to form hooks or keepers 12, the bills 13 of which are offset toward the arms and, as shown in detail in Figure 3 of the drawings, normally extend in spaced parallel relation thereto. Riveted or otherwise secured to the body plate are confronting angle plates 13' seating flat thereagainst and snugly fitting between the upstanding flanges of these plates is a longitudinally curved traction calk 14 extending transversely with respect to the arms 11. The upper margins of the calk are beveled to provide a biting edge and engaged through the end portions of said flanges and through the end portions of the calk are rivets 15 firmly securing the calk in position. This construction provides an arrangement whereby, when the calk has become worn in such degree that it must be replaced, the rivets 15 may simply be punched out when the old calk may be removed and a new calk substituted therefor.

As previously intimated, my improved device is intended for use upon the non-skid chains of motor vehicles. In Figure 1 of the drawings, I have shown the device secured in operative position to a pair of the cross strands 16 of a non-skid chain. As will be observed, the device is of a length to extend transversely between the pair of cross strands so that the device as a whole will be disposed circumferentially of the vehicle tire to seat flat thereagainst while the calk 14 will extend transversely with respect to the tire upstanding from the tire tread. Since the hook bills 13 normally extend in spaced relation to the arms 11, as previously explained, said hooks may be readily engaged with the cross strands 16 so that the device may thus be easily applied, and fitting freely through the hooks from the lower sides of the arms 11 are transversely extending bolts 17 engaged through one of the links of the respective cross strands within the hooks. The nuts at the upper ends of the bolts serve to hold the bolts against accidental displacement so that said bolts will operate to lock the device against shifting transversely of the tire along the cross strands, thus maintaining the device in position overlying the tread of the tire. Securing the bills 13 of the hooks at their free end portions are bolts 18 which are fitted through the arms 11 from the lower sides thereof and through the hook bills, being equipped at their upper ends with nuts which may be adjusted for binding the bills of the hooks against said arms. The device will thus be securely held upon the cross strands while, when desired, the device may be readily removed.

In use, one of the devices may be arranged to extend between each pair of cross strands of the non-skid chains of the vehicle and, as will be seen, the calks 14 will provide an effective purchase for the rear wheels of the vehicle so that the full tractive effort of said wheels may be realized in passing over ice or slippery roads or in pulling out of mud. Furthermore, the device will operate in conjunction with the non-skid chains to overcome side skidding of the vehicle. I accordingly provide a highly effective device for the purpose set forth and, as will now be seen, a device which may be readily employed in connection with conventional tire chains as now in common use and will operate with efficiency upon substantially any conventional make of motor vehicle.

Having thus described the invention, what is claimed as new is:

1. The combination with a non-skid chain having a pair of cross strands, of a body plate provided at its ends with means receiving the strands therethrough, means engaged through the first means and through said strands locking the plate against movement along the strands, and an upstanding calk carried by the plate.

2. The combination with a non-skid chain having a pair of cross strands, of a body plate provided at its ends with hooks engaging around the strands, bolts extending through said hooks and through the strands locking the plate against movement along the strands, bolts securing the hook bills at their free end portions, and an upstanding calk carried by the plate.

In testimony whereof I affix my signature.

THEODORE C. AYERS. [L. S.]